Aug. 4, 1964 H. G. TASKER ETAL 3,143,646

SIMULTANEOUS EQUATION SOLVER

Filed March 30, 1959 2 Sheets-Sheet 1

INVENTORS

HOMER G. TASKER

ANDREW W. MEYER

BY Lester S. Hecht

ATTORNEY

Aug. 4, 1964 H. G. TASKER ET AL 3,143,646

SIMULTANEOUS EQUATION SOLVER

Filed March 30, 1959 2 Sheets-Sheet 2

INVENTORS
HOMER G. TASKER
ANDREW W. MEYER
BY Lester S. Hecht
ATTORNEY

United States Patent Office 3,143,646
Patented Aug. 4, 1964

3,143,646
SIMULTANEOUS EQUATION SOLVER

Homer G. Tasker and Andrew W. Meyer, Los Angeles, Calif., assignors to Tasker Instruments Corporation, Hollywood, Calif.

Filed Mar. 30, 1959, Ser. No. 803,017
10 Claims. (Cl. 235—180)

This invention relates to computers, and more particularly to electrical computers for solving sets of simultaneous equations, or single equations which can be expressed as a set of simultaneous equations.

In mathematics, simultaneous equations are ordinarily solved serially, i.e. the equations are manipulated until the value of one variable is determined, and this value is then substituted into the remaining equations to determine the value of the second variable, and so on until all variables of the equations have been determined. In the prior art, computers for solving simultaneous equations have been constructed in accordance with serial solution techniques, where the value determined for one unknown quantity is applied to a circuit for determining a second unknown quantity. Examples of such computers can be found described on pages 335 through 338 of "Electronic Analogue Computers" by Korn and Korn, published in 1956 by McGraw-Hill.

In FIG. 6.55A on page 337 of the above-noted publication is shown a computer for solving the simultaneous equations:

$$R=X^2+Y^2 \tag{1}$$

$$\theta=\arc\tan\frac{Y}{X} \tag{2}$$

which are the transformation equations from rectangular to polar coordinates. In the circuit of FIG. 6.55A, the transformation Equations 1 and 2 are mechanized as an equivalent set of equations:

$$-X\sin\theta+Y\cos\theta=0 \tag{3}$$

$$X\cos\theta+Y\sin\theta=R \tag{4}$$

Equations 3 and 4 are embodied by two sine-cosine function potentiometers attached to a common shaft, with a summing amplifier connected to each function potentiometer. The two terms in the left hand member of Equation 3 are generated through one function potentiometer (located at the top of the drawing in FIG. 6.55A) and added together in the corresponding summing amplifier. To satisfy Equation 3 the shaft must assume an angle $\theta_1$ which makes Equation 3 equal to zero. If the shaft angle is incorrect, an error signal appears at the output of the summing amplifier, and this error signal is applied to a servo system which drives the shaft to an angle $\theta_1$ which reduces the error signal to zero, thus satisfying Equation 3. After arriving at the correct value for $\theta$, the shaft is held at that value by the feedback loop of the servo system.

The left hand terms of Equation 4 are generated through the other function potentiometer (located at the bottom of the drawing in FIG. 6.55A) and added together in the second summing amplifier. Since the shaft angle has been set to the proper value $\theta_1$ in accordance with Equation 3, the output of the second summing amplifier thus gives the correct value for R. It can be seen that the shaft angle $\theta_1$ in this computer is both the solution to the first equation and an input to the circuit for solving the second equation.

In FIG. 6.55B on page 337 of the above-noted publication is shown a second circuit for solving Equations 3 and 4. In this circuit a single resolver replaces the function potentiometers and summing amplifiers. Alternating current voltages corresponding to X and Y are fed to respective stator windings in a resolver, and the rotor of the resolver is driven by a servo amplifier to seek an angle where the voltage induced in a control winding thereof by the two stator windings equals zero. Since the voltage induced in the control winding of the rotor is equal to the left hand member of Equation 3, the angle $\theta_1$ which nulls the control winding voltage also solves Equation 3. An output winding on the rotor at right angles to the control winding embodies Equation 4, thus making the voltage induced in the output winding equal to R when the shaft is at an angle $\theta_1$ which satisfies Equation 3. In this circuit the shaft angle $\theta_1$ also doubles as a solution of the first equation and as an input to the circuit for solving the second equation.

Each of the above described prior art computers depends upon determining a first unknown $\theta$ from one equation, and inserting the value determined for $\theta$ into a circuit for solving a second equation to determine a second unknown R. This approach has several drawbacks: first, any error in the value of the first unknown is introduced into the circuit for determining the second unknown, therefore compounding inaccuracies in the value of the second unknown. Second, the value for the first unknown must be fixed before the second unknown can be determined, therefore placing a restriction on the application and response time of the computer. In the computers discussed above, the response time is limited by the speed of the servo loop in driving the shaft to angle $\theta_1$, and if more variables were included the speed limit would be even lower, since each variable would have to stabilize at its correct value before the succeeding variable could be determined. Also, these computers cannot be used in cases where the unknown quantities must be continuously changed, since the value of each variable must be fixed to derive the value of others. And finally, serial solution computers become very complex and costly when many unknown variables are involved in the equations.

However, in accordance with this invention there has been devised a circuit for solving simultaneous equations simultaneously, i.e. without first solving for one variable and using the value of that variable to determine a second variable. It will be shown that this invention provides a computer wherein the error in one variable is not carried over to other variables, and wherein the speed of computation is substantially independent of the number of variables and equations involved. It will also be shown that this invention provides a computer which does not require complex circuitry to fix and hold the values of variables in order to solve a set of equations, and that this invention provides a computer which can solve simultaneous equations in which all variables are continuously changing.

These advantages are achieved by providing independent means for solving each simultaneous equation, with each means being operable to produce an equality signal whenever the corresponding equation is solved, and with the equality signals applied to a coincidence circuit which produces a coincidence signal when all equations are solved at the same time. The coincidence signal can be used to trigger recording means to record the instantaneous values of all variables at the time of coincidence, thereby simultaneously solving for all variables in all equations. The coincidence signal may alternately be used to trigger other circuitry, depending on the application of the invention.

In a specific embodiment of the invention for solving the rectangular to polar transformations (1) and (2) above, this invention provides a computer which performs the function of the prior art computers without a servo system to drive a shaft and hold it fixed on a certain angle to solve the transformations. Instead, the shaft representing $\theta$ is continuously rotated and the voltage representing R is continuously changed, with the instantaneous values thereof recorded whenever the transformation equations are solved at the same time. Thus the speed of readout in this embodiment is not limited by the response time of a servosystem, but depends only upon the maximum speed at which the shaft representing $\theta$ can be revolved.

Accordingly, one principal object of this invention is to provide a computer for solving simultaneous equations simultaneously.

Another object of this invention is to provide a computer wherein the error in one variable is not carried across into the circuitry for determining other variables.

Yet another object of this invention is to provide a computer which does not require one or more variables to be fixed in order to determine values for remaining variables.

A further object of this invention is to provide a computer which can be generalized to handle any number of variables and equations without requiring complex circuitry interconnecting between devices representing the separate equations thereof.

An additional object of this invention is to provide a computer for translating from rectangular to polar coordinates which does not require a servo amplifier and complex feedback loop.

A specific object of this invention is to provide a computer for translating from rectangular to polar coordinates which has a higher limiting speed of readout than heretofore known in the art.

Other objects and advantages of this invention will be apparent to those skilled in the art from the following description of several illustrative embodiments thereof, in connection with the attached drawings, in which.

Figure 1:
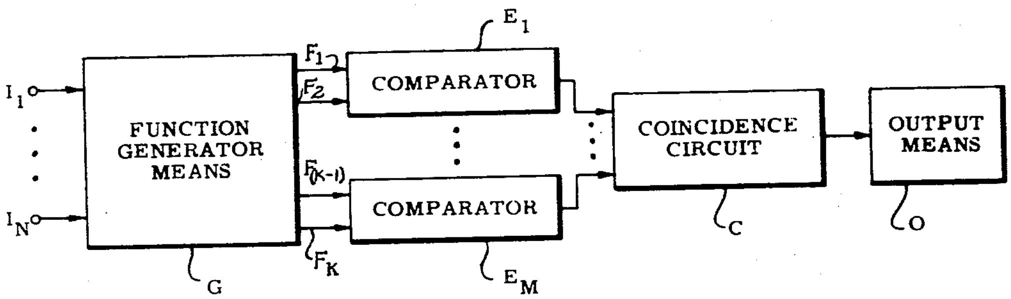
FIG. 1 is a block diagram disclosing a general embodiment of the invention.
Figure 3:
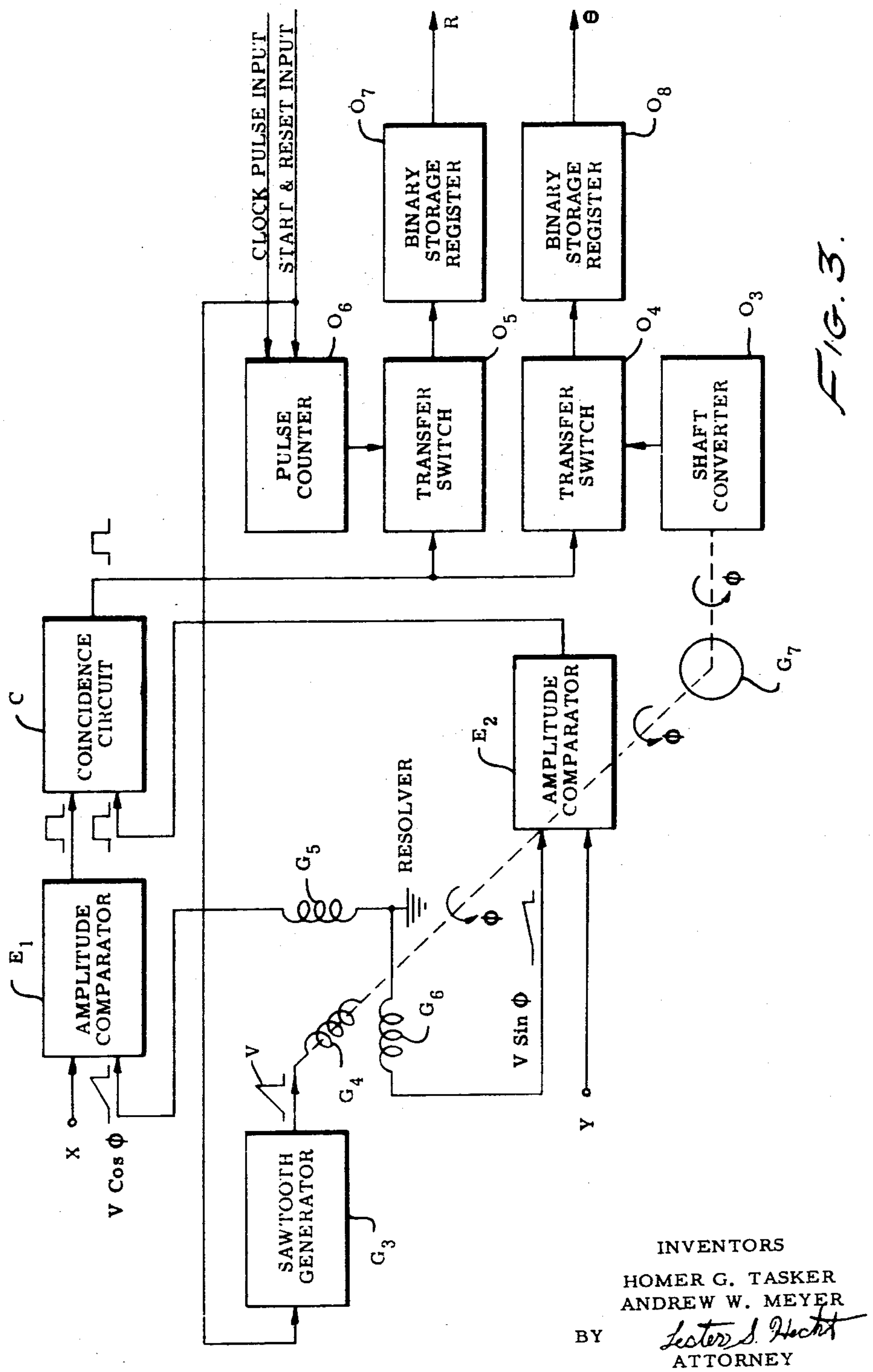
FIG. 3 is a partial schematic diagram of a specific arrangement for the system of FIG. 2.

Reference is now made to FIG. 1, which discloses a general embodiment of the invention adapted to solve any number of simultaneous equations in any number of variables. Input signals $I_1$ through $I_N$ representing variables are applied to function generator means G, which produces output functions $F_1$ through $F_K$ representing members of simultaneous equations. One suitable form for function generator G is shown in FIG. 3 where a specific arrangement incorporating the invention is shown. The output functions $F_1$ through $F_K$ are applied in pairs to respective comparators $E_1$ through $E_N$, which act to produce an output equality signal when the corresponding pair of functions are equal. Each comparator and its associated pair of functions represents one of the set of simultaneous equations, the functions representing the left and right hand members of the equation. The output of each comparator is fed to a coincidence circuit C, which produces a coincidence signal when triggered by equality signals from all of the comparators at the same time. The coincidence signal thus indicates that all of the equations represented by the comparators and their associated functions are solved at the same time. The coincidence signal is used to trigger output means O, which may include means for recording the instantaneous value of the input signals $I_1 \ldots I_N$.

Figure 2:
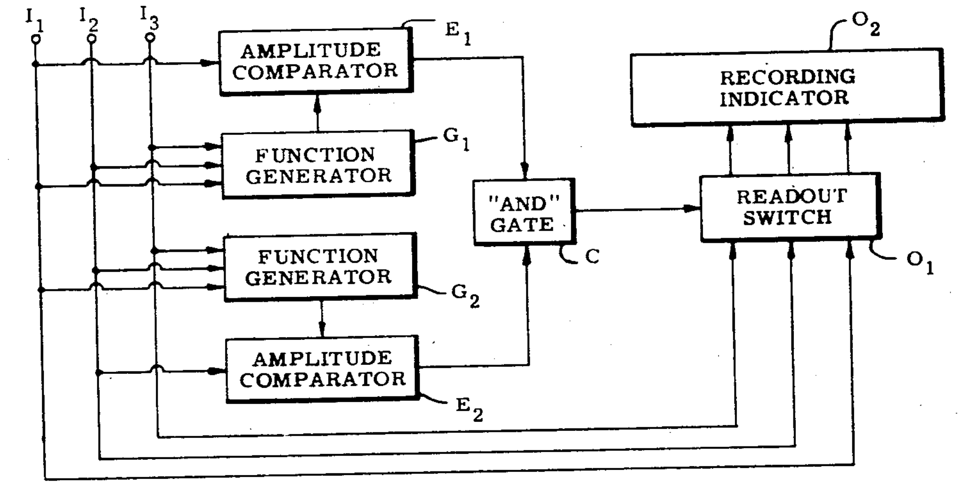
FIG. 2 is a block diagram illustrating a more specific arrangement of the invention of FIG. 1 where three input variables are present.

In FIG. 2 is shown a specific embodiment of the invention for solving the simultaneous equations:

$$I_1=F_1(I_1, I_2, I_3) \quad (5)$$

$$I_2=F_2(I_1, I_2, I_3) \quad (6)$$

The right-hand member of Equation 5 is generated by function generator $G_1$ and compared to $I_1$ in amplitude comparator $E_1$. The right-hand member of Equation 6 is generated by function generator $G_2$ and compared to $I_2$ in amplitude comparator $E_2$. Amplitude comparators $E_1$ and $E_2$ produce equality signals whenever their corresponding equations are equal, and a coincidence signal is produced by "and" gate C whenever both equations are equal at the same time. The coincidence signal from "and" gate C operates a readout switch $O_1$, which opens to allow the instantaneous values of the input signals $I_1$, $I_2$, and $I_3$ to be displayed and recorded on a recording indicator $O_2$.

The embodiment of the invention disclosed in FIG. 2 may be utilized in several ways. If two of the input signals represent known quantities and the third an unknown quantity, a variable signal source which sweeps through all possible values of the unknown quantity may be used as the third input signal. When the variable signal reaches a value simultaneously solving Equations 5 and 6, that value will be recorded on the recording indicator. If only one of the inputs represents a known quantity, variable signal sources may be used for the other two input signals, with the two variable signal sources coordinated to sweep through all possible pairs of values for the two unknown quantities. In other cases, all three input signals may represent variable quantities, and the circuit may function to actuate circuitry when the variable quantities bear the relationship to each other as defined by Equations 5 and 6. For example, this invention may be used to solve an equation to determine when overload conditions have been reached in complex machinery such as found in oil refineries. The overload condition would be a function of variable quantities which change during the operation of the machine, and therefore the overload computer would have to be capable of functioning with continuously varying inputs. In this application, the output circuit would be adapted to shut the machinery off when the coincidence signal indicated an overload condition.

In FIG. 3 a specific arrangement of the system of FIG. 2 is shown and is adapted to translate from rectangular coordinates X and Y to polar coordinates R and $\theta$ according to the transformation Equations 1 and 2 noted above. In this embodiment Equations 1 and 2 are mechanized as an equivalent equation pair:

$$X=R\cos\theta \quad (7)$$

$$Y=R\sin\theta \quad (8)$$

It should be noted that Equations 7 and 8 are much simpler than the corresponding Equations 3 and 4 for the prior art computers, even though both are equivalent to transformation Equations 1 and 2. In prior art computers it was necessary to mechanize the transformation equations in a form where one of the equations contained only one variable therein, which could be solved and used in a second equation which contained both variables, thus effectively reducing the second equation to a single variable. But in accordance with the simultaneous solution techniques of this invention, it is possible to use equations each containing both of the variables such as Equations 7 and 8.

The right-hand terms of Equations 7 and 8 are mechanized in a resolver which has a variable voltage V applied to a rotor winding $G_4$. The rotor is continuously driven by a motor $G_7$, such that its shaft angle continuously changes while the variable voltage V runs through its cycle. The variable voltage V is generated by a sawtooth generator $G_3$. Current flow through the rotor winding $G_4$ induces a voltage in stator winding $G_5$ equal to $V\cos\phi$ and a voltage in stator winding $G_6$ equal to $V\sin\phi$. The voltages induced in windings $G_5$ and $G_6$ are compared respectively with voltages representing X and Y in amplitude comparators $E_1$ and $E_2$, which produce an equality pulse when the inputs thereto are equal. The equality pulses can only coincide when the variable voltage V is equal to R and the shaft angle equal to $\theta$ as determined by Equations 7 and 8 above. These values are the polar equivalents R and $\theta$ corresponding to the X and Y signal inputs.

In this embodiment of the invention the quantities representing R and $\theta$ are converted into binary form before being applied to the transfer switches $O_4$ and $O_5$, which are actuated by the coincidence signal to release the instantaneous values of V and $\phi$ to storage registers $O_7$ and $O_8$ at the time of coincidence. The shaft angle $\phi$ is converted to binary form in shaft converter $O_3$. The variable voltage V is converted to binary form by a pulse counter $O_6$ interacting with clock pulse inputs and the sawtooth generator $G_3$. The output voltage V of sawtooth generator $G_3$ starts from zero and increases linearly with time. Therefore, the time lapse between the start of the sawtooth and the coincidence signal is a direct measure of the voltage at the time of coincidence. This time can be conveniently converted to a binary number by starting the pulse counter $O_6$ and sawtooth generator $G_3$ with a common start pulse, and resetting both to zero with a common reset pulse.

The speed of readout in this embodiment is determined by the angular velocity of the resolver shaft and the frequency of the sawtooth output from generator $G_3$. If the sawtooth frequency is very high relative to the frequency of the resolver shaft, coincidence will occur once during each revolution of the resolver. If the sawtooth frequency is low relative to the shaft frequency, two or more revolutions of the resolver shaft may be required to insure a coincidence signal. The specific frequencies chosen will depend on the individual circumstances in each application of the invention, as will be well understood by those skilled in the art.

From the foregoing description it is apparent that this invention provides a novel computer which solves simultaneous equations simultaneously, without requiring that one variable be first determined and used to determine other variables. It is also apparent that this invention can be easily generalized to handle any number of simultaneous equations in any number of variables, and that this invention provides a computer in which the mechanized equations may each contain all of the unknown quantities. In addition, it can be seen that this invention provides a computer in which all unknown quantities may be continuously varied, and in which the error in one unknown quantity is not carried across into the solution for other unknown quantities.

It should be expressly understood that the embodiments of the invention disclosed above are intended as illustrative only, and that many modifications may be made in the specific arrangements disclosed without departing from the spirit of this invention. For example, in the embodiment disclosed in FIG. 3 the values for R and $\theta$ may be presented in analog rather than digital form. Also, a different conversion system might be utilized rather than the pulse counter shown, and the variable signal V might be some non-linear function of time. And, the functions representing the transformation equations might be generated in function potentiometers rather than in a resolver. These and many other modifications will be apparent to those skilled in the art, and this invention includes all modifications falling within the scope of the following claims:

We claim:

1. A computer for receiving first and second input signals X and Y representing two known quantities in a two equation relationship of the form:

$$Xf_1+Yf_2=0$$
$$Xf_3+Yf_4=0$$

where $f_1$, $f_2$, $f_3$, and $f_4$ are functions of two unknown variables W and Z, to be solved for, said computer comprising: first means for producing a variable signal $W_v$ having an amplitude passing through the entire expected range for W; second means for varying the value of a signal $Z_v$ corresponding to the value of Z to be solved for; third means for solving the first of said two equations, said third means including first and second amplitude comparators and a translating device for developing signals corresponding to $f_1$ to $f_2$ and being operative to produce pulses when each of said functions is solved; a coincidence circuit responsive to said pulses for sampling the values of $W_v$ and $Z_v$ upon coincidence of the solution to $f_1$ and $f_2$ to produce output signals representing the unknowns W and Z.

2. A device for translating a plurality of input signals, including first and second input signals, in a first coordinate system, into a plurality of corresponding output signals, including third and fourth signals, in a second coordinate system, said device comprising: first means for producing a variable signal having an amplitude which varies throughout the entire expected range for said third signal; second means, responsive to said fourth signal and to said first and second signals for producing at least two intermediate function signals representing the solution of at least one equation representing the translation from one system of coordinates to the other; a coincidence circuit for receiving said two intermediate functions signals and for producing an output signal indicating the time of coincidence in amplitude between said two intermediate function signals; and an output circuit for sensing the instantaneous amplitude of said variable signal produced by said first means in response to said output signal.

3. The device defined in claim 2 wherein said first means is a sawtooth generator for producing a signal representing a variable R in polar coordinates.

4. The device defined in claim 2 wherein said second means includes a resolver for receiving a signal $\theta$ representing said fourth signal and also receives a signal R representing said third signal and produces resolved signals $R \sin \theta$ and $R \cos \theta$.

5. The device defined in claim 2 wherein said second means includes first and second amplitude comparator circuits, and wherein said first means includes a sawtooth generator, said amplitude comparator circuits being operable to produce pulses when the amplitude of said variable signal becomes equal for the first time to said first and second signals applied respectively to said first and second amplitude comparator circuits.

6. A computer for receiving two input signals X and Y in rectangular coordinates and translating these signals into output signals R and $\theta$, said computer comprising: a function generator for receiving a signal V having a variable amplitude covering the expected range of R, and a signal $\phi$ covering the expected range of $\theta$, said function generator being operable to produce signals representing $V \sin \phi$ and $V \cos \phi$; first and second comparators for comparing X to $V \cos \phi$ and Y to $V \sin \phi$, respectively, each comparator being operable to produce an intermediate signal when the corresponding signals compared are equal; a coincidence circuit including an "and" gate coupled to both of said comparators, said "and" gate being operable to produce a coincidence signal in response to the occurrence of simultaneous intermediate signals produced by said comparators; and measurement and recording means operable to record the instantaneous values of V and $\phi$ in response to said coincidence signal, said instantaneous values constituting R and $\theta$.

7. The computer defined in claim 6 wherein said signal V comprises a sawtooth shaped voltage; and wherein said input signals X and Y are D.C. voltages; said function generator comprising a resolver having a rotor winding and two stator windings, the shaft angle of said resolver comprising said variable signal $\phi$, and said signal V being applied to the rotor winding of said resolver and said function signals $V \sin \phi$ and $V \cos \phi$ being taken from respective stator windings of said resolver.

8. The computer defined in claim 7 wherein said variable voltage V and said shaft angle $\phi$ are continuously changed in such a manner as to cover all possible values in a finite span of time.

9. A computer for translating input signals representing the rectangular coordinates X and Y of a point into output signals representing the polar coordinates R and $\theta$ of the same point, said computer comprising: a first signal source for generating a variable signal V, a second variable signal source for generating a variable signal $\phi$, a first function generator for forming a signal representing $V \sin \phi$, a second function generator for forming a signal representing $V \cos \phi$, a first comparator having an input terminal coupled to said signal representing X and another input terminal coupled to said signal representing $V \cos \phi$, a second comparator having an input terminal coupled to said signal representing Y and another input terminal coupled to said signal representing $V \sin \phi$, each comparator being operable to produce an output equality signal when said two input signals thereto are equal, the output of each comparator coupled to an "and" gate, said "and" gate being operable to produce a coincidence signal when the output equality signals of said comparators coincide with respect to time; indicator means coupled to said first and second variable signal sources, said indicator means responsive to said coincidence signal to indicate the instantaneous values of signals V and $\phi$ at the time of coincidence, said instantaneous value of signal V representing said polar coordinate R, and said instantaneous value of signal $\phi$ representing said polar coordinate $\theta$.

10. A device for translating input signals X and Y representing the rectangular coordinates of a point and input signal $\theta$ representing the angular position of said point with respect to an origin into an output signal R representing the distance from said point to said origin, said device comprising: first means for producing a variable signal of an amplitude passing through the entire expected range for signal R, second means responsive to input signal $\theta$ and to the variable signal produced by said first means to produce resolved first and second output signals; third means for comparing the first resolved output signal with input signal X to provide a first equality signal; fourth means for comparing the resolved output signal with input signal Y to provide a second equality signal; and fourth means for sensing the instantaneous amplitude of said variable signal upon coincidence of said first and second equality signals; and the instantaneous magnitude of said variable signal at the time of coincidence comprising said output signal R.

References Cited in the file of this patent

UNITED STATES PATENTS

| | | |
|---|---|---|
| 2,785,856 | Hobbs | Mar. 19, 1957 |
| 3,011,151 | Ketchledge | Nov. 28, 1961 |